United States Patent
Torri et al.

(10) Patent No.: US 7,283,531 B2
(45) Date of Patent: Oct. 16, 2007

(54) ENHANCED RECOVERY ACTION IN SERVICE SPECIFIC CONNECTION ORIENTATION PROTOCOL

(75) Inventors: Richard J. Torri, North Aurora, IL (US); David Steven Trollope, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 995 days.

(21) Appl. No.: 10/624,377

(22) Filed: Jul. 22, 2003

(65) Prior Publication Data

US 2005/0020291 A1    Jan. 27, 2005

(51) Int. Cl.
*H04L 12/28* (2006.01)
*H04J 3/06* (2006.01)

(52) U.S. Cl. .................. 370/394; 370/509
(58) Field of Classification Search ........... 370/394, 370/509, 236, 235, 392
See application file for complete search history.

(56) References Cited

U.S. PATENT DOCUMENTS

| | | | |
|---|---|---|---|
| 6,629,261 B1 * | 9/2003 | Chintada et al. | 714/4 |
| 6,697,331 B1 * | 2/2004 | Riihinen et al. | 370/410 |
| 6,765,869 B2 * | 7/2004 | Chintada et al. | 370/230 |
| 6,888,816 B2 * | 5/2005 | Jiang | 370/346 |
| 2002/0110243 A1 * | 8/2002 | Jiang et al. | 380/273 |
| 2002/0118667 A1 * | 8/2002 | Chintada et al. | 370/349 |
| 2003/0095534 A1 * | 5/2003 | Jiang | 370/449 |

OTHER PUBLICATIONS

ITU-T Recommendation Q.2110, *International Telecommunication Union*, Jul. 1994, pp. 1-94.

* cited by examiner

*Primary Examiner*—Andrew C. Lee

(57) ABSTRACT

A method of carrying out a recovery action upon peers becoming out of synchronization with one another is provided in a telecommunications signaling network comprising a sending peer (30) that sends sequenced data messages to an associated receiving peer (40). The method includes: sending a poll message from the sending peer (30) to the receiving peer (40), the poll message indicating a sequence number for a sequenced data message to be sent next; returning a response to the poll message from the receiving peer (40) to the sending peer (30), the response indicating that the sequence number indicated in the poll message is the one expect next by the receiving peer (40) or indicating an error when the sequence number indicated in the poll message is not the one expect next by the receiving peer (40), as the case may be; and, entering into a recovery action state upon the response to the poll message indicating an error, wherein while in the recovery action state selected sequenced data messages received by the receiving peer (40) from the sending peer (30) subsequent to entry into the recovery action state are buffered by the receiving peer (40).

10 Claims, 3 Drawing Sheets ions and the reliable exchange of signalling information between signaling entities. The International Telecommunication Union-Telecommunication Standardization Sector (ITU-T) has set forth what is known as the Q.2110 standard (July 1994), incorporated herein by reference in its entirety, to specify a peer-to-peer protocol for the transfer of information and control between pairs of SSCOP entities.

ENHANCED RECOVERY ACTION IN SERVICE SPECIFIC CONNECTION ORIENTATION PROTOCOL

FIELD

The present invention relates to the telecommunication arts. It finds particular application in conjunction with a Signaling System No. 7 (SS7) broadband network such as SS7 signaling over Asynchronous Transfer Mode (ATM), and will be described with particular reference thereto. However, it is to be appreciated that the present invention is also amenable to other like applications.

BACKGROUND

In ATM signaling layers, what is known as a Service Specific Connection Orientation Protocol (SSCOP) provides mechanisms for the establishment and release of connections and the reliable exchange of signalling information between signaling entities. The International Telecommunication Union-Telecommunication Standardization Sector (ITU-T) has set forth what is known as the Q.2110 standard (July 1994), incorporated herein by reference in its entirety, to specify a peer-to-peer protocol for the transfer of information and control between pairs of SSCOP entities.

With reference to FIG. 1, part of the aforementioned Q.2110 standard is a recovery action that is employed when a data message sending node or peer (i.e., sender 10) and an associated data message receiving node or peer (i.e., receiver 20) become out of synchronization with one another. That is to say, in a properly executed signaling scenario, sequential data messages are transmitted from the sender 10 to the receiver 20 in order. However, in transit the messages may get out of order, e.g., due to differing transmission delays, different routing paths, etc. When this happens a recovery action is taken to rectify the situation. In the traditional recovery action, a state is entered wherein otherwise properly received data messages are dropped with no notification to the user or other protocol layers at the receiving end. In the example shown, a finite signaling scenario is defined by the sender 10 attempting to send a series of sequenced data messages (namely, data messages having sequence numbers 1 through 8) to the receiver 20. In the usual manner, the data messages are sequentially sent from a retransmission buffer 12 on the sender side. The data messages are received on the receiver side, and under normal operating conditions, loaded in a reception buffer 22. From the reception buffer 22, the data messages are passed up to a user or other protocol layers on the receiving end.

Periodically or at otherwise designated times, poll messages are sent from the sender 10 to the receiver 20 to verify synchronization of the peers. The poll messages typically indicate the sequence number of the next data message that is to be transmitted. The receiver 20 responds to the poll messages by either indicating confirmation that the same sequence number is expected or that there is an error (i.e., that some other sequence number is expected). When an error is encountered, recovery action is immediately taken and the aforementioned state is entered whereby subsequently received data messages are dropped at the receiving end.

For example, in the particular scenario shown, data messages 1-3 are send and received in proper order. Then, a poll message is sent indicating the next data message to be sent from the sender 10 is number 4, and (being that 1-3 have already been received) the response thereto is that the receiver 20 is expecting number 4. The sender 10 then proceeds to sent in order data messages 4-6, followed by another poll message indicating number 7 is the next data message, followed by data messages 7 and 8. The receiver 20 receives data messages 4-6 in the proper order, however, for what ever reason, data message 7 is received before the corresponding poll message. Therefore, when the poll message is received (indicating the next message to be sent is number 7), the receiver 20 (having already received message number 7) is expecting message number 8. The response to the poll message therefore indicates an error and recovery action is immediately initiated such that thereafter further received data messages (namely number 8) are dropped without being sent to the user or other protocol layers at the receiving end. Consequently, data message number 8 will have to be resent. However, as can be appreciate from the present example, data message number 8 was otherwise already received once in the proper order. The resending of data messages in such instances represents a certain inefficiency associated with the traditional recovery action strategy.

The present invention contemplates a new and improved recovery action system and/or technique that overcomes the above-referenced problems and others.

SUMMARY

In accordance with an aspect of the present invention, a method of carrying out a recovery action upon peers becoming out of synchronization with one another is provided in a telecommunications signaling network comprising a sending peer that sends sequenced data messages to an associated receiving peer. The method includes: sending a poll message from the sending peer to the receiving peer, the poll message indicating a sequence number for a sequenced data message to be sent next; returning a response to the poll message from the receiving peer to the sending peer, the response indicating that the sequence number indicated in the poll message is the one expect next by the receiving peer or indicating an error when the sequence number indicated in the poll message is not the one expect next by the receiving peer, as the case may be; and, entering into a recovery action state upon the response to the poll message indicating an error, wherein while in the recovery action state selected sequenced data messages received by the receiving peer from the sending peer subsequent to entry into the recovery action state are buffered by the receiving peer.

In accordance with another aspect of the present invention, in a telecommunications signaling network comprising a sending peer that sends sequenced data messages to an associated receiving peer, a system is provided for carrying out a recovery action upon the peers becoming out of synchronization with one another. The system includes: means for sending a poll message from the sending peer to the receiving peer, the poll message indicating a sequence number for a sequenced data message to be sent next; means for returning a response to the poll message from the receiving peer to the sending peer, the response indicating that the sequence number indicated in the poll message is the one expect next by the receiving peer or indicating an error when the sequence number indicated in the poll message is not the one expect next by the receiving peer, as the case may be; and, means for entering into a recovery action state upon the response to the poll message indicating an error, wherein while in the recovery action state selected sequenced data messages received by the receiving peer from the sending peer subsequent to entry into the recovery action state are buffered by the receiving peer.

In accordance with yet another aspect of the present invention, a telecommunications signaling network includes: a first node that transmits sequenced data messages in a set order and periodically interspersed therewith poll messages indicating a sequence number of a next sequenced data message to be transmitted; a second node in operative communication with the first node to receive the sequenced data messages transmitted therefrom and response to the poll messages, each response to each poll message indicating that the sequence number indicated in the poll message is the one expect next by the second node or indicating an error when the sequence number indicated in the poll message is not the one expect next by the second node, as the case may be, the telecommunications signaling network entering a recovery state upon a response indicating an error, the recovery state operative to synchronize the first and second nodes with one another; and, a buffer, wherein while in the recovery state, selected sequenced data messages received by the second node subsequent to entering the recovery state are saved in the buffer.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF PREFERRED EMBODIMENTS

For clarity and simplicity, the present specification shall refer to structural and/or functional network elements, entities and/or facilities, relevant communications standards, protocols and/or services, and other components that are commonly known in the communications art without further detailed explanation as to their configuration or operation except to the extent the same has been modified or altered in accordance with and/or to accommodate aspects of the present invention.

Figure 1:
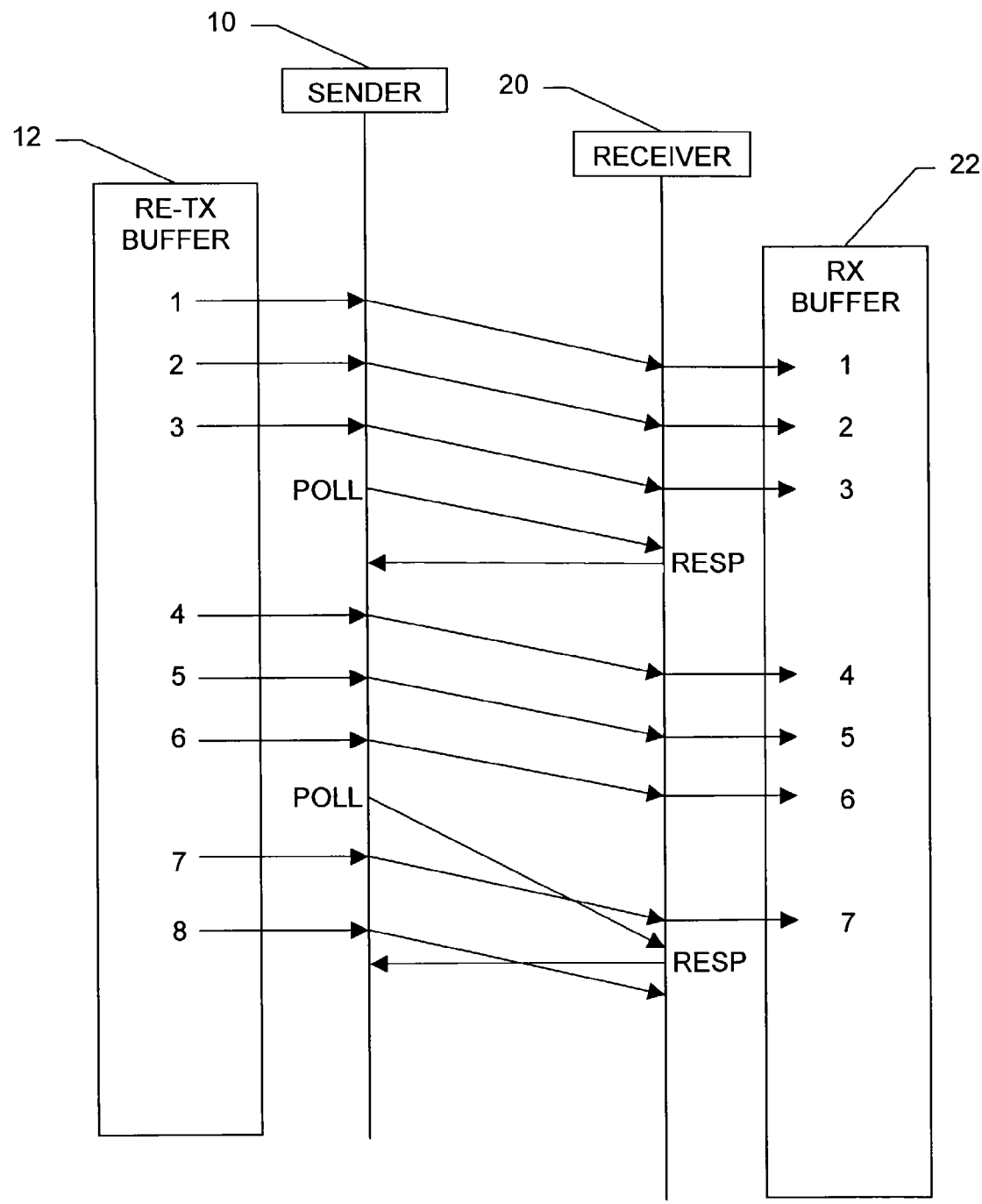
FIG. 1 is a combination block/ladder diagram showing a traditional recovery action.
Figure 2:
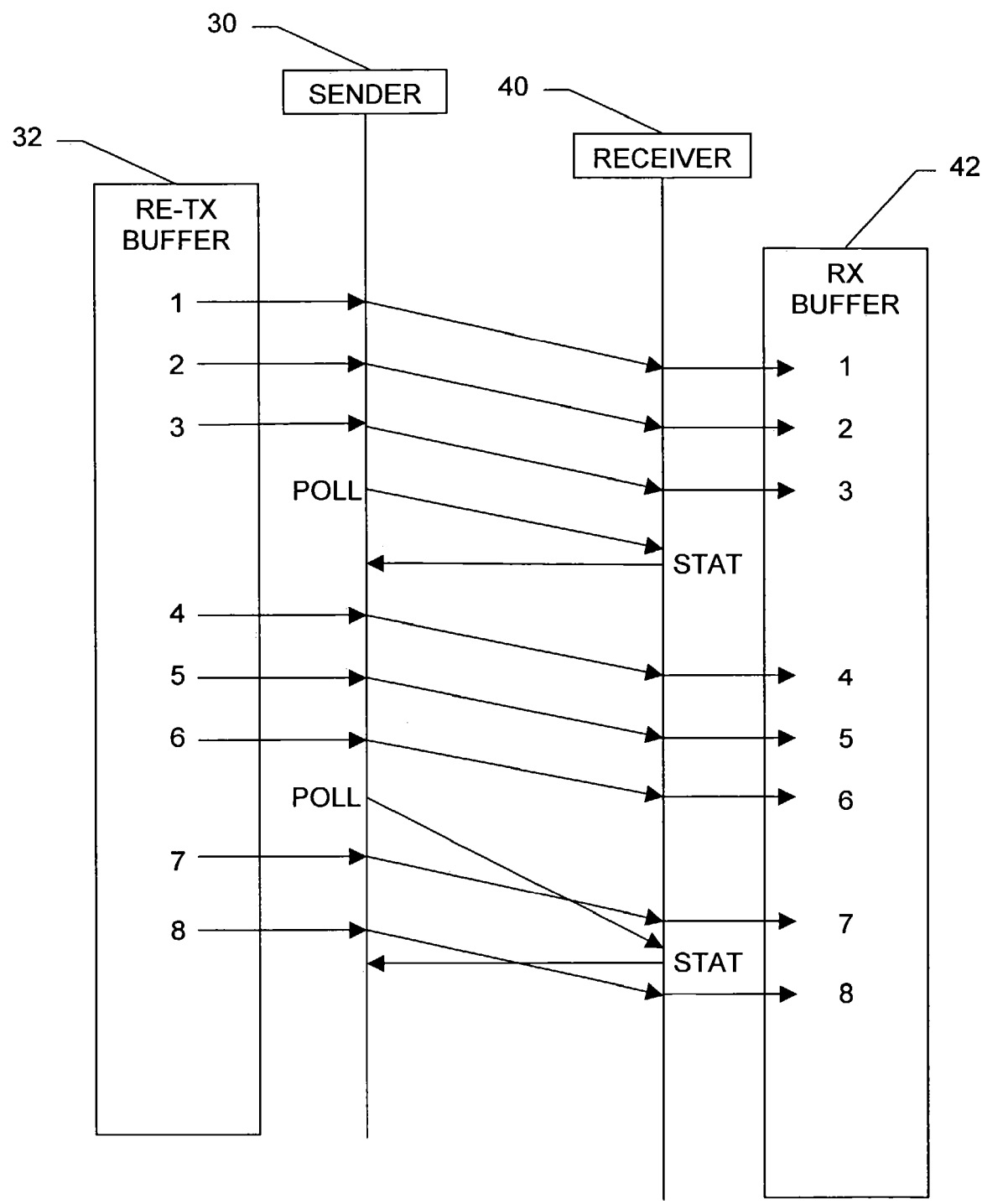
FIG. 2 is a combination block/ladder diagram showing an enhanced recovery action in accordance with aspects of the present invention.

With reference to FIG. 2, to illustrate the difference between an enhanced recovery action according to aspects of the present invention and a traditional recovery action, the enhanced recovery action is described by way of reference to an associated sending and receiving pair of SSCOP entities (i.e., a sender 30 and a receiver 40) involved in the same exemplary finite call scenario described in the background of the present specification.

In a properly executed signaling scenario, sequenced data messages are transmitted from the sender 30 to the receiver 40 in order. However, in transit the messages may get out of order, e.g., due to differing transmission delays, different routing paths, etc. When this happens an enhanced recovery action state is entered to rectify the situation. Again, in the example shown, the finite signaling scenario is defined by the sender 30 sending a series of sequenced data messages (namely, data messages having sequence numbers 1 through 8) to the receiver 40. In the usual manner, the data messages are sequentially sent from a retransmission buffer 32 on the sender side. The data messages are received on the receiver side, and under normal operating conditions, loaded in a reception buffer 42. Notably, in accordance with the process illustrated in FIG. 3 (described below), selected data messages received subsequent to entering the enhanced recovery action state are still loaded into the reception buffer rather than simply being dropped as is the case in the traditional recovery action.

Suitably, a send state variable, VT(S), is used to track the sequence, number (SN) on the sending side, and a receive state variable, VR(R), tracks the SN on the receiving side. When a sequenced data (SD) message is sent, the VT(S) value is mapped to a parameter, N(S), accompanying the SD message, and the VT(S) is then incremented accordingly. Similarly, the VR(R) is incremented upon each reception of an SD message. In this manner, the sender 30 (independent of the receiver 40) keeps track of the SN of the next SD message to be sent; the receiver 40 (independent of the sender 30) keeps track of the SN of the next SD message expected; and the SD messages themselves are accompanied by their respective SNs.

Periodically or at otherwise designated times, poll messages, POLL, are sent from the sender 30 to the receiver 40 to verify synchronization of the peers. The poll messages indicate the SN of the next data message that is to be transmitted. The receiver 20 responds to the poll messages, e.g., with a solicited status response, STAT, either indicating confirmation that the same SN is expected or that there is an error (i.e., that some other SN is expected), as the case may be. When an error is encountered, the enhance recovery action is taken. See, e.g., FIG. 3.

In turn, the data messages loaded into the reception buffer 42 are eventually passed up to a user or other protocol layers on the receiving end. For example, the reception buffer 42 may be cleared and the data messages therein passed up upon each successful poll response, i.e., non-error STAT message.

Again, in the particular scenario shown, SD messages 1-3 are send and received in proper order. Then, a poll message is sent indicating the next SD message to be sent from the sender 30 is SN=4, and (being that 1-3 have already been received) the response thereto is that the receiver 40 is expecting SN=4. The sender 30 then proceeds to sent in order SD messages 4-6, followed by another poll message indicating SN=7 is the next SD message, followed by SD messages 7 and 8. The receiver 40 receives SD messages 4-6 in the proper order, however, for what ever reason, SD message 7 is received before the corresponding poll message. Therefore, when the poll message is received (indicating the next message to be sent is SN=7), the receiver 40 (having already received message number 7) is expecting SD message having SN=8. The response to the poll message, STAT, therefore indicates an error and the enhanced recovery action is initiated in accordance with the process described with reference to FIG. 3.

Figure 3:
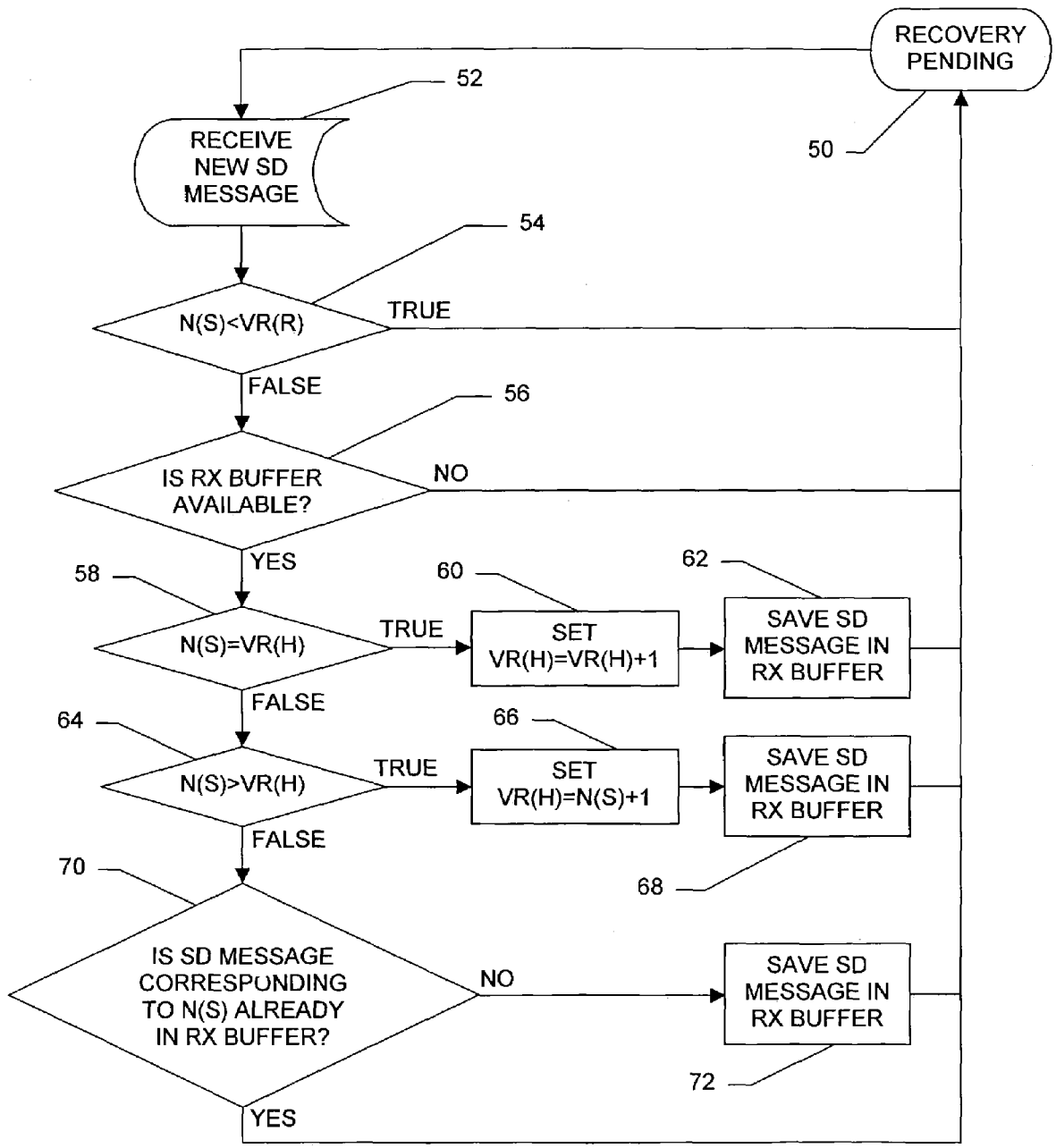
FIG. 3 is a flow chart showing a exemplary process for carrying out the enhanced recover action shown in FIG. 2.

With reference to FIG. 3, an exemplary recovery action process is described. At reference numeral 50, the process is in a recovery pending state. That is to say, a STAT message indicating an error has been encounter and the enhanced recovery action has begun. While in the pending state, the process begin when the receiver 40 receives another SD message from the sender 30 at step 52.

Next, at decision step 54, it is determined if the expression N(S)<VR(R) is true or false. That is to say, it is determined if the actual SN of the received SD message is less than the SN for the next SD message expected by the receiver 40. If the expression is true, then the process simply loops back to the recovery pending state 50 (i.e., without buffering the newly received SD message), otherwise, if false, the process continues on to decision step 56.

At decision step 56, it is determined if the reception buffer 42 is available for writing to. If no, then the process simply loops back to the recovery pending state 50 (i.e., without buffering the newly received SD message), otherwise, if yes, the process continues on to decision step 58.

At decision step 58, it is determined if the expression N(S)=VR(H) is true or false, wherein VR(H) is a state variable maintained at the receiver 40. VR(H) represents a highest expected value for N(S). That is to say, the reception buffer 42 has a finite size. Accordingly, a finite number of SD messages may be loaded therein. Accordingly, VR(H) defines an upper limit of a data window that encompasses a finite range of SD messages. If the expression N(S)=VR(H) is true, then at step 60 VR(H) is incremented by 1 (i.e., the data window is advanced or slid forward one to make room for the newly received SD message) and at step 62 the newly received SD message is saved in the reception buffer 42 (after which the process returns to the recovery pending state 50). Otherwise, if the express N(S)=VR(H) is false, the process continues on to decision step 64.

At decision step 64, it is determined if the expression N(S)>VR(H) is true or false. If the expression N(S)>VR(H) is true, then at step 60 VR(H) is incremented by N(S)+1 (i.e., the data window is advanced or slid forward by an appropriate amount to make room for the newly received SD message) and at step 66 the newly received SD message is saved in the reception buffer 42 (after which the process returns to the recovery pending state 50). Otherwise, if the express N(S)>VR(H) is false, the process continues on to decision step 70. It is to be appreciated that at this point it has been determined that the data window is sufficiently positioned to accommodate the new received SD message.

At decision step 70, it is determined if an SD message corresponding to the N(S) of the newly received message is already stored in the reception buffer 42. If yes, then the process simply loops back to the recovery pending state 50 (i.e., without buffering the newly received SD message), otherwise, if no, the process continues on to step 72 where the newly received SD message is saved in the reception buffer 42 (after which the process returns to the recovery pending state 50).

As can be appreciate from the forgoing description, the enhanced recovery action permits selected SD messages that are received after the recovery state has been entered to be saved in the reception buffer 42 unlike the traditional recovery action in which such messages are simply dropped (i.e., not saved in the reception buffer). Accordingly, the buffered messages are made available to the user or other protocol layers at the receiving end. If messages are dropped during the signaling scenario as with the traditional recovery action, the scenario will likely fail and some amount of retransmission will then be needed to recover. On the other hand, with the enhanced recovery action, there is a greater likelihood that SD messages will be effectively delivered to the user on the receiving end and consequently a greater likelihood that the singaling scenario will be complete successfully. Further, with the enhanced recovery action, the amount or retransmission in a recovery situation is minimized.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a telecommunications signaling network comprising a sending peer that sends sequenced data messages to an associated receiving peer, a method of carrying out a recovery action upon the peers becoming out of synchronization with one another, said method comprising:
   (a) sending a poll message from the sending peer to the receiving peer, said poll message indicating a sequence number for a sequenced data message to be sent next;
   (b) returning a response to the poll message from the receiving peer to the sending peer, said response indicating that the sequence number indicated in the poll message is the one expect next by the receiving peer or indicating an error when the sequence number indicated in the poll message is not the one expect next by the receiving peer, as the case may be; and,
   (c) entering into a recovery action state upon the response to the poll message indicating an error, wherein while in said recovery action state selected sequenced data messages received by the receiving peer from the sending peer subsequent to entry into the recovery action state are buffered by the receiving peer.

2. The method of claim 1, wherein the sending peer and receiving peer are Service Specific Connection Oriented Protocol (SSCOP) entities.

3. The method of claim 1, further comprising:
   passing sequenced data messages that are buffered by the receiving peer up to a user at the receiving end.

4. The method of claim 1, further comprising:
tracking at the receiving peer the sequence number of the sequenced data message expected to be received next; and,
while in the recovery action state, determining if a sequenced data message received by the receiving peer subsequent to entry in the recovery action state has a sequence number less than the sequence number being tracked, such that if it is less, then the subsequently received sequenced data message is not buffered.

5. In a telecommunications signaling network comprising a sending peer that sends sequenced data messages to an associated receiving peer, a system for carrying out a recovery action upon the peers becoming out of synchronization with one another, said system comprising:
means for sending a poll message from the sending peer to the receiving peer, said poll message indicating a sequence number for a sequenced data message to be sent next;
means for returning a response to the poll message from the receiving peer to the sending peer, said response indicating that the sequence number indicated in the poll message is the one expect next by the receiving peer or indicating an error when the sequence number indicated in the poll message is not the one expect next by the receiving peer, as the case may be; and,
means for entering into a recovery action state upon the response to the poll message indicating an error, wherein while in said recovery action state selected sequenced data messages received by the receiving peer from the sending peer subsequent to entry into the recovery action state are buffered by the receiving peer.

6. The system of claim 5, wherein the sending peer and receiving peer are Service Specific Connection Oriented Protocol (SSCOP) entities.

7. The system of claim 5, further comprising:
means for passing sequenced data messages that are buffered by the receiving peer up to a user at the receiving end.

8. The system of claim 5, further comprising:
means for tracking at the receiving peer the sequence number of the sequenced data message expected to be received next; and,
while in the recovery action state, means for determining if a sequenced data message received by the receiving peer subsequent to entry in the recovery action state has a sequence number less than the sequence number being tracked, such that if it is less, then the subsequently received sequenced data message is not buffered.

9. A telecommunications signaling network comprising:
a first node that transmits sequenced data messages in a set order and periodically interspersed therewith poll messages indicating a sequence number of a next sequenced data message to be transmitted;
a second node in operative communication with said first node to receive the sequenced data messages transmitted therefrom and response to the poll messages, each response to each poll message indicating that the sequence number indicated in the poll message is the one expect next by the second node or indicating an error when the sequence number indicated in the poll message is not the one expect next by the second node, as the case may be, said telecommunications signaling network entering a recovery state upon a response indicating an error, said recovery state operative to synchronize the first and second nodes with one another; and,
a buffer, wherein while in said recovery state, selected sequenced data messages received by the second node subsequent to entering the recovery state are saved in the buffer.

10. The network of claim 9, wherein the first and second nodes are Service Specific Connection Oriented Protocol (SSCOP) entities.

* * * * *